(12) United States Patent
Takatani et al.

(10) Patent No.: US 7,295,512 B2
(45) Date of Patent: Nov. 13, 2007

(54) PERFORMANCE ENHANCED TCP COMMUNICATION SYSTEM

(75) Inventors: Yukihiro Takatani, Tokyo (JP); Naomichi Nonaka, Sano (JP); Minoru Koizumi, Yokohama (JP)

(73) Assignees: Hitachi, Ltd., Tokyo (JP); Hitachi Information Technology Co., Ltd., Kanagawa-ken (JP)

( * ) Notice: Subject to any disclaimer, the term of this patent is extended or adjusted under 35 U.S.C. 154(b) by 1025 days.

(21) Appl. No.: 10/166,312

(22) Filed: Jun. 11, 2002

(65) Prior Publication Data

US 2003/0026258 A1    Feb. 6, 2003

(30) Foreign Application Priority Data

Jun. 14, 2001   (JP)   ............................. 2001-179483

(51) Int. Cl.
 H04J 1/16    (2006.01)
 H04J 3/16    (2006.01)
 H04L 12/28   (2006.01)

(52) U.S. Cl. ...................... 370/229; 370/389; 370/401; 370/466

(58) Field of Classification Search ................ 370/229, 370/231, 389, 401, 464, 465, 369, 466, 469
See application file for complete search history.

(56) References Cited

U.S. PATENT DOCUMENTS

| 4,775,974 A | 10/1988 | Kobayashi |
| 5,519,699 A | 5/1996 | Ohsawa |
| 6,415,329 B1 * | 7/2002 | Gelman et al. ............. 709/245 |
| 6,587,435 B1 | 7/2003 | Miyake et al. |

(Continued)

FOREIGN PATENT DOCUMENTS

DE    19910023    9/2000

(Continued)

OTHER PUBLICATIONS

Ghani, N.; Dixit, s.; TCP/IP Enchancements for Satellite Networks; Communications Magazine, IEEE, Volumn 37, Issue 7, Jul. 1999, pp. 64-72.*

(Continued)

Primary Examiner—Huy D. Vu
Assistant Examiner—Nittaya Juntima
(74) Attorney, Agent, or Firm—Mattingly, Stanger, Malur & Brundidge, P.C.

(57) ABSTRACT

A system for use with communications according to TCP, or a similar protocol, includes a sender host, one or more routers, and a destination host. Each router includes means for generating acknowledgement packets and translating addresses associated with data packets. When a data packet is received by a router, an acknowledgement packet is returned with a source address corresponding to the router and a destination address corresponding to the sender host. The sender host perceives the acknowledgement packet as having been sent by the destination host. As the acknowledgment packet is sent by the router, and not the destination packet is sent by the router, and not the destination host, this system allows acknowledgment packets to be received on a shorter timescale, reducing the effects of a link delay. Although the route between the sender host and the destination host is divided into multiple connections, the hosts perceive a single, conventional connection.

3 Claims, 16 Drawing Sheets

U.S. PATENT DOCUMENTS

| | | | |
|---|---|---|---|
| 6,701,370 B1* | 3/2004 | Dillon | 709/230 |
| 2001/0046210 A1* | 11/2001 | West et al. | 370/231 |
| 2002/0073225 A1 | 6/2002 | Dillon et al. | |

FOREIGN PATENT DOCUMENTS

| | | |
|---|---|---|
| EP | 0 597 691 | 5/1994 |
| FR | 2778804 | 11/1999 |
| JP | 61-070823 | 4/1986 |
| JP | 07-250100 | 9/1995 |
| JP | 11-112576 | 4/1999 |
| JP | 11-205384 | 7/1999 |
| JP | A-11-313109 | 11/1999 |

OTHER PUBLICATIONS

West, M.; McCann, S.; "Improved TCP performance over long-delay and error-prone links"; Satellite Services and the Internet, IEE Seminar on Feb. 17, 2000, pp. 8/1-8/9.*

"Performance Enhancement For TCP/IP On A Satellite Channel" by Stadler, et al. Military Communications Conference, 1998. MILCOM 98. PROCEEDINGS., IEEE Boston, MA, USA Oct. 18-21, 1998, New York, NY, USA, IEEE, US, vol. 1, Oct. 18, 1998, pp. 270-276.

"Transmission Control Protocol", REC (Request For Comments) 793, Sep. 1981, Information Sciences Institute, University of Southern California.

* cited by examiner

FIG.3

1500 ADDRESS TRANSLATION INFORMATION TABLE

| | | | | |
|---|---|---|---|---|
| 1501 — | OUTER IP ADDRESS 1 | OUTER IP ADDRESS 2 | ... | OUTER IP ADDRESS n |
| 1502 — | OUTER PORT NUMBER 1 | OUTER PORT NUMBER 2 | ... | OUTER PORT NUMBER n |
| 1503 — | INNER IP ADDRESS 1 | INNER IP ADDRESS 2 | ... | INNER IP ADDRESS n |
| 1504 — | INNER IP NUMBER 1 | INNER PORT NUMBER 2 | ... | INNER PORT NUMBER n |
| 1505 — | EDGE IP ADDRESS 1 | EDGE IP ADDRESS 2 | ... | EDGE IP ADDRESS n |
| 1506 — | EDGE PORT NUMBER 1 | EDGE PORT NUMBER 2 | ... | EDGE PORT NUMBER n |

FIG.7

2500 VIRTUAL CONNECTION INFORMATION TABLE

| | | | | |
|---|---|---|---|---|
| 2501 | ACTIVE HOST IP ADDRESS 1 | ACTIVE HOST IP ADDRESS 2 | ... | ACTIVE HOST IP ADDRESS n |
| 2502 | ACTIVE HOST PORT NUMBER 1 | ACTIVE HOST PORT NUMBER 2 | ... | ACTIVE HOST PORT NUMBER n |
| 2503 | ACTIVE EDGE IP ADDRESS 1 | ACTIVE EDGE IP ADDRESS 2 | ... | ACTIVE EDGE IP ADDRESS n |
| 2504 | ACTIVE EDGE PORT NUMBER 1 | ACTIVE EDGE IP ADDRESS 2 | ... | ACTIVE EDGE IP ADDRESS n |
| 2505 | ACTIVE INTERNAL IP ADDRESS 1 | ACTIVE INTERNAL IP ADDRESS 2 | ... | ACTIVE INTERNAL IP ADDRESS n |
| 2506 | ACTIVE INTERNAL PORT NUMBER 1 | ACTIVE INTERNAL PORT NUMBER 2 | ... | ACTIVE INTERNAL PORT NUMBER n |
| 2507 | PASSIVE HOST IP ADDRESS 1 | PASSIVE HOST IP ADDRESS 2 | ... | PASSIVE HOST IP ADDRESS n |
| 2508 | PASSIVE HOST PORT NUMBER 1 | PASSIVE HOST PORT NUMBER 2 | ... | PASSIVE HOST PORT NUMBER n |
| 2509 | PASSIVE EDGE IP ADDRESS 1 | PASSIVE HOST IP ADDRESS 2 | ... | PASSIVE EDGE IP ADDRESS n |
| 2510 | PASSIVE EDGE PORT NUMBER 1 | PASSIVE EDGE PORT NUMBER 2 | ... | PASSIVE EDGE PORT NUMBER n |
| 2511 | PASSIVE INTERNAL IP ADDRESS 1 | PASSIVE INTERNAL IP ADDRESS 2 | ... | PASSIVE INTERNAL IP ADDRESS n |
| 2512 | PASSIVE INTERNAL PORT NUMBER 1 | PASSIVE INTERNAL PORT NUMBER 2 | ... | PASSIVE INTERNAL PORT NUMBER n |

SOURCE HOST 80   NORMAL ROUTER              DESTINATION HOST 90

(FORWARDING)

●--------● TCP CONNECTION

COMMUNICATION ARCHITECTURE OF
COMMUNICATION EQUIPMENTS

PERFORMANCE ENHANCED TCP COMMUNICATION SYSTEM

BACKGROUND OF THE INVENTION

The present invention relates to a system for high-speed communication using the Transmission Control Protocol (TCP), or a similar protocol, which requires a host to acknowledge the receipt of data.

The TCP protocol, as documented in RFC (Request For Comments) 793, is widely used for high reliability data communication and has functions for error correction, flow control, etc. According to the TCP protocol, when a receiver host receives data, it sends an acknowledgement to a sender host. Where TCP communication is carried out through a link with a large delay, the time interval between the transmission of data by the sender host and its receipt of the acknowledgement may be considerable. This may lead to the TCP window of the sender host becoming full as further data cannot be transmitted until the acknowledgement for the previously transmitted data packets from the receiver host has been received. Thus, in conventional TCP communication through a large-delay link, though the transmission rate of the delay link may be high, the bandwidth may be utilized inefficiently because of this inherent constraint in the TCP protocol.

One solution to this problem would be to modify the TCP protocol to reduce the effect of the link delay. It is technically possible to improve the TCP protocol. However, this would require the simultaneous reconfiguration of several thousands or more communication apparatuses, rendering this solution impractical.

SUMMARY OF THE INVENTION

It is an object of the present invention to provide a system which, when communication according to TCP or a similar protocol is carried out with use of a high-speed link with a large delay, can reduce the effect of the delay and allow high-speed communication without modifying the existing protocol.

In a first aspect of the present invention, a communication system, hereafter referred to as a router, for transmitting information from a source device to a destination device according to a predetermined protocol, the router being associated with an address, comprises a processor configured to receive a data packet from a first device, the data packet comprising a data packet source address and a data packet destination address, send the data packet to a second device, send an acknowledgement packet to the first device in response to the reception of a data packet, the acknowledgement packet comprising an acknowledgement packet source address and translate addresses associated with a data or acknowledgement packet, wherein the address translator is configured to change the acknowledgement packet source address from the router address to the data packet destination address.

One or more routers according to this aspect of the invention may be included in a communication system. The communication system may be arranged to allow bi-directional communication or uni-directional communication The router may comprise means for terminating connections between the hosts on its path and means for causing the connections to simulate a single connection. The address translating means translates the destination address of a packet sent from the network of the local system into the address of the router and with respect to a packet sent from the network system to the router and forwarded to a host, its source address from the address of the router to its original source address.

As a result, a user can transmit data through the series of connections while perceiving a conventional single connection. As the connection is terminated at the router, an acknowledgement can be returned to the sender host quickly. Even when a delay link is used as the communication route, high-speed communication can be realized without modifying the existing protocol.

In conventional systems, a router does not perform an address translation, but simply analyses the packet contents and sends acknowledgement packets. On the other hand, the present invention applies the method of translating addresses of packets and terminating connections. The application of this system does not require any changes to the protocol program itself, facilitating system integration.

The invention further provides a method for managing a communication packet in a communication apparatus, which is coupled between a first computer and a second computer where the first computer and the second computer communicate with each other, said method executed by said communication apparatus comprising the steps of receiving a communication packet sent by said first computer, said communication packet having an address of said first computer as a source address and an address of said second computer as a destination address, generating an acknowledgement packet corresponding to said communication packet and having the address of said second computer as a source address and the address of the first computer as a destination address, sending said acknowledgement packet to said first computer whereby a connection is established between said first computer and said communication apparatus and forwarding a communication packet, which includes at least a part of the data included in said communication packet sent by said first computer, to said second computer in order to establish a connection between said communication apparatus and said second computer.

A communication system according to the present invention, wherein TCP communication is carried out between hosts via a network system, and a time until a window size of a source host reaches its upper limit is longer than a time until reception of a TCP acknowledgement, comprises said network system and a relay device including one edge router and another edge router connected to a local system to which each host for communication belongs and provided between nodes, wherein said one edge router is provided at a boundary between the local system to which a source host belongs and said network system and said another edge router provided at a boundary between the local system to which a destination host belongs and said network system terminates a TCP connection on its own edge router, and divides the TCP connection into three TCP connections between the source host and edge router, between the edge routers and between edge router and destination host to cause the edge routers to perform a TCP acknowledgement operation.

Embodiments of the present invention will now be described with reference to the attached drawings.

BRIEF DESCRIPTION OF THE DRAWINGS

FIG. 3 shows the data structure of an address translation information table;

FIG. 7 shows the data structure of a virtual connection information table;

DETAILED DESCRIPTION OF THE EMBODIMENTS

The disclosures of all articles and references, including patent documents, mentioned in this application are incorporated herein by reference for all purposes.

Figure 1:
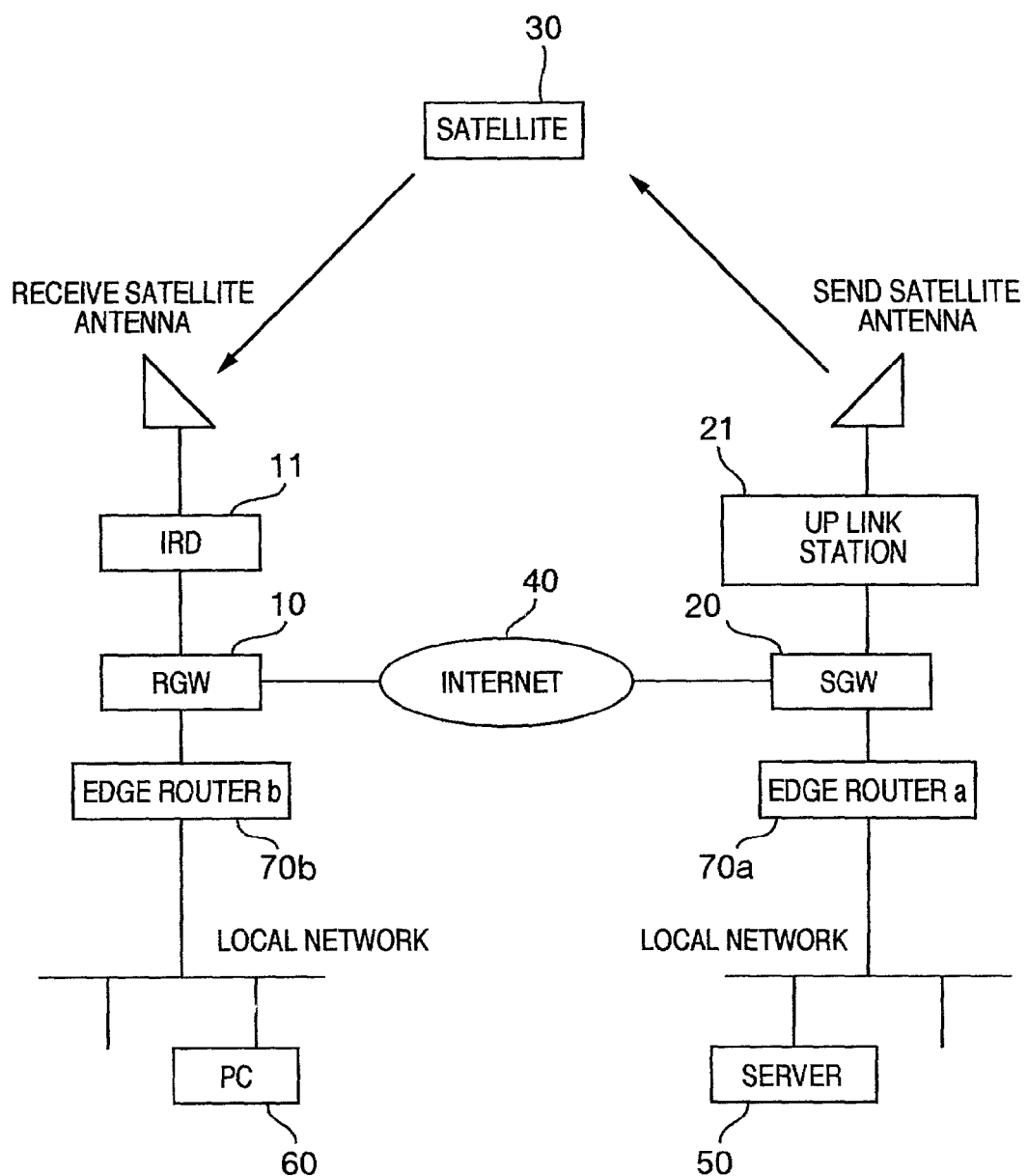
FIG. 1 depicts a TCP performance enhancement system according to the present invention.

FIG. 1 shows an enhanced TCP communication system according to the present invention, which comprises a receive gateway 10 (RGW), an integrated receiver decoder 11 (IRD), a send gateway 20 (SGW), an uplink station 21, a satellite 30, an Internet 40, a source host, e.g., a server 50, a destination host, e.g., a personal computer (PC) 60, and routers 70a, b.

A transmitter antenna and a receiver antenna can communicate uni-directionally via the satellite 30. The antennae can also communicate bi-directionally over the Internet 40. A system in which the RGW 10 and SGW 20 can communicate through both a satellite link and the Internet allows asymmetric routing of data packets. In the present embodiment, a packet to be sent from the PC 60 to server 50 is transmitted via a first local network, an edge router 'b' 70b, the RGW 10, the Internet 40, SGW 20, an edge router 'a' 70a and a second local network. A packet to be sent from the server 50 to the PC 60 is transmitted via the second local network, edge router 'a' 70a, SGW 20, uplink station 21, satellite 30, IRD 11, RGW 10, router 'b' 70b, and the first local network to PC 60. For details of the asymmetric routing using the RGW 10 and SGW 20, refer to JP-A-10-346455, entitled "Communication equipment, Asymmetric Link Communication System And Asymmetric Link Communication Method".

Each of the routers 70 forms the terminal of the TCP connections between the hosts, which simulate a single unbroken TCP connection. Since the routers 70 form the ends of the TCP connections, an acknowledgement can be sent over a network other than the delay link, so that high-speed communication can be realized without causing the TCP window to fill up. In previous systems, the time interval between the transmission of data from a sender host and its reception of an acknowledgement could be considerable and the effect of this delay was reduced by increasing the window size of the router 70. Furthermore, since the user perceives a conventional TCP connection between the PC 60 and the server 50, the user can conduct the TCP communication in the same manner as in a conventional system. This "virtual" TCP connection is simulated using address translation means provided in the router 70.

The SGW 20 and edge router 70a or the RGW 10 and edge router 70a of the TCP performance enhancement system may, in some cases, be formed as identical communication apparatuses. The communication system may be used when one or more PC's 60 are connected to the local network and communication between the server 50 and PC 60 and is not limited to a one-to-one relationship as simultaneous transmission from a single server 50 to a plurality of PC's 60 can be implemented. In the communication system, a communication route other than the Internet 40 and satellite 30 can be employed. Even when there is a plurality of different communication routes, a communication system according to the present invention can be used.

The router 70 will now be described in greater detail. The function of the router 70 is identical for both edge routers 70a, 70b. Thus the following description does not make a distinction between edge router 'a' 70a and edge router 'b' 70b.

A processing program to be operated in the router may include three software modules: a dazzler (also called a virtualizing module), a coupler (also called a connection module) and a mediator (also called an establishing module).

The dazzler facilitates the simulation of a single continuous TCP connection by means of address translation, which is performed according to an address translation information table. When a packet is received by the router with address information that does not correspond to any of the entries in the address translation table, the router issues a new registration request (active nominate (ANOM) command) to the mediator, and receives new address translation information from the mediator. When receiving a command from the mediator for deleting address translation information, the router deletes the relevant information from the table. The word 'active' as used herein refers to a host that sent the connection establishment command. Thus the active- and passive-side hosts dynamically vary, but, in this embodiment, the router function is identical, whether the router is located on the active or passive side of the network.

The mediator is a software module that instructs another module to establish or release a TCP connection. The mediator has a virtual connection information table. When an active nominate command is received from the dazzler, the mediator sends a passive nominate (PNOM) command to the opposing mediator, sends an active couple (ACOU) command to the coupler, and sends an address translation information update (ATIU) command to the dazzler. When receiving a passive nominate command from the mediator of the opposing edge router 70, the mediator sends a passive couple command to the coupler and sends an address translation information register (ATIR) command to the dazzler. When receiving a release (RELE) command from the coupler, the mediator sends the release command to the opposing mediator, sends the release command to the coupler, and further sends an address translation information delete (ATID) command to the dazzler.

The coupler performs a process that establishes a connection with the opposing coupler, copying packet data sent from the host and sending it to the opposing coupler. The coupler operates as a separate process for each connection. A parent process, when receiving an active couple command or passive couple (PCOU) command from the mediator, connects to the opposing coupler and generates a child process. The child process performs copying operations between TCP connections terminating on the router 70. When completing the copying operation, the child process sends a release command to the mediator. The parent process terminates the child process when a release command is received from the mediator.

Figure 2:
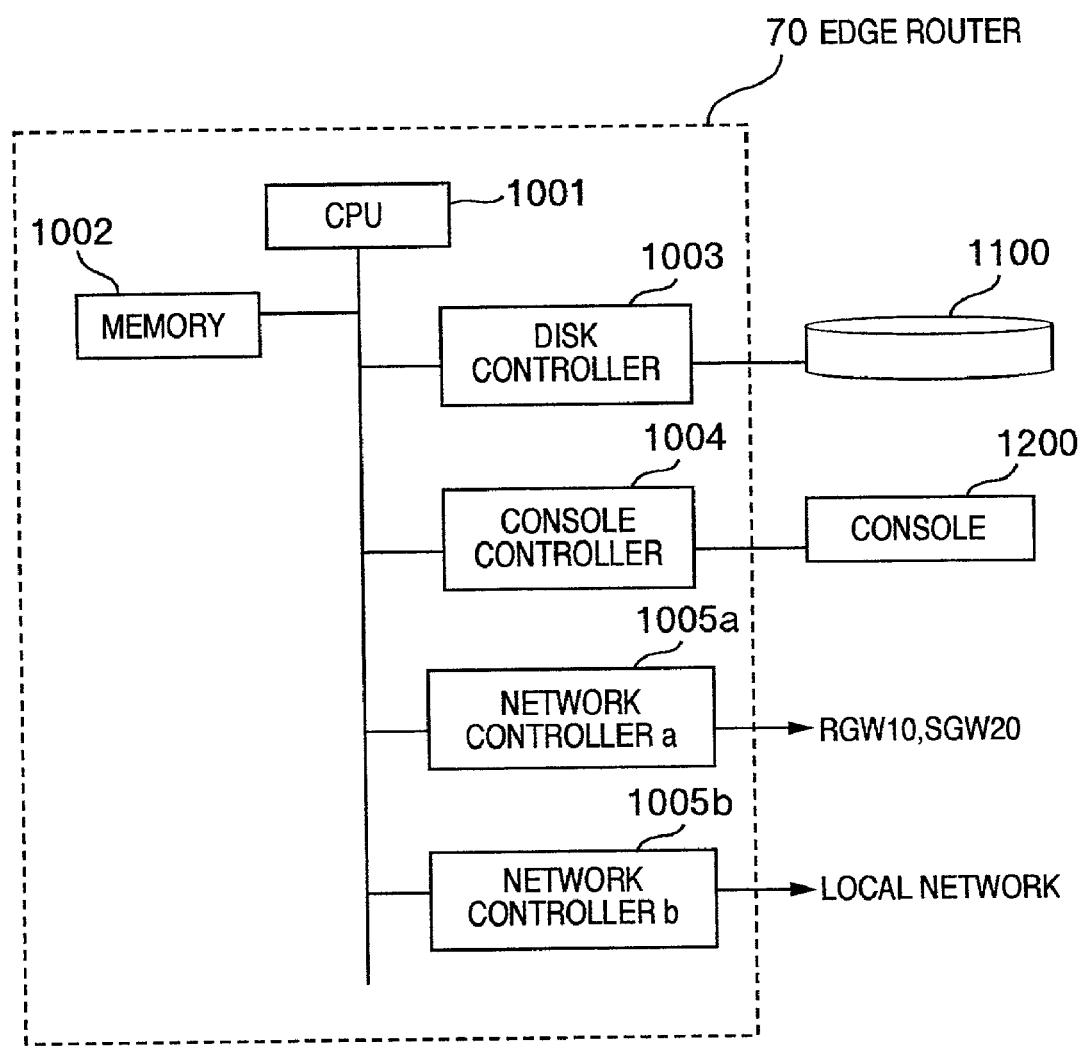
FIG. 2 shows the hardware configuration of a router according to the present invention.

FIG. 2 shows the hardware configuration of the router 70. As shown in FIG. 2, the router includes a CPU 1001, a memory 1002, a disk controller 1003, a hard disk 1100, a console controller 1004, a console 1200, and a network controller 1005.

The CPU 1001 controls the entire operation of the router 70. The memory 1002 stores a program and data therein. The disk controller 1003 controls the hard disk 1100. The hard disk 1100 stores a program and data therein. The console controller 1004 controls the console 1200. The console 1200 performs input/output operation between users. A network controller 'a' 1005*a* communicates with the SGW 20 or RGW 10. A network controller 'b' 1005*b* communicates with the associated local network.

The edge router 70 is controlled by the CPU 1001, which executes a processing program to be explained below. The program includes three software modules: the dazzler (which will be referred to as virtual module), the coupler (which will be referred to as connection module), and the mediator (which will be referred to as establishment module).

FIG. 3 shows a data structure of an address translation information table 1500, which is used by the dazzler program in its operation. The address translation information table 1500 has an outer IP address field 1501, an outer port number field 1502, an inner IP address field 1503, an inner port number field 1504, an edge IP address field 1505, and an edge port number field 1506.

The IP address and port number of an outside host when viewed from the edge router 70 are stored in the outer IP address field 1501 and outer port number field 1502 respectively. The inner IP address field 1503 and inner port number field 1504 contain the IP address and port number of a host provided inside when viewed from the edge router 70. Also stored in the edge IP address field 1505 and edge port number field 1506 are the IP address and port number of the network controller 'b' 1005*b* installed in the edge router 70.

The word 'outer' as used herein refers to a network of the edge router 70 connected to the local network, whereas, the word 'inner' refers to a network of the edge router 70 connected on its side opposite to the local network.

When a data packet is received by the edge router 70, the dazzler performs address translation in one of two ways according to the transmission direction of the packet. With respect to a packet sent from the outer side to the inner, when the destination address of the packet coincides with an inner address and the source address thereof coincides with an outer address, the dazzler translates the destination address into the edge router address (hereafter referred to as an edge address). With respect to a packet sent from the inner side to the outer, where the destination address of the packet coincides with an outer address and the source address thereof coincides with the edge address, the dazzler translates the source address into an inner address.

Figure 4:
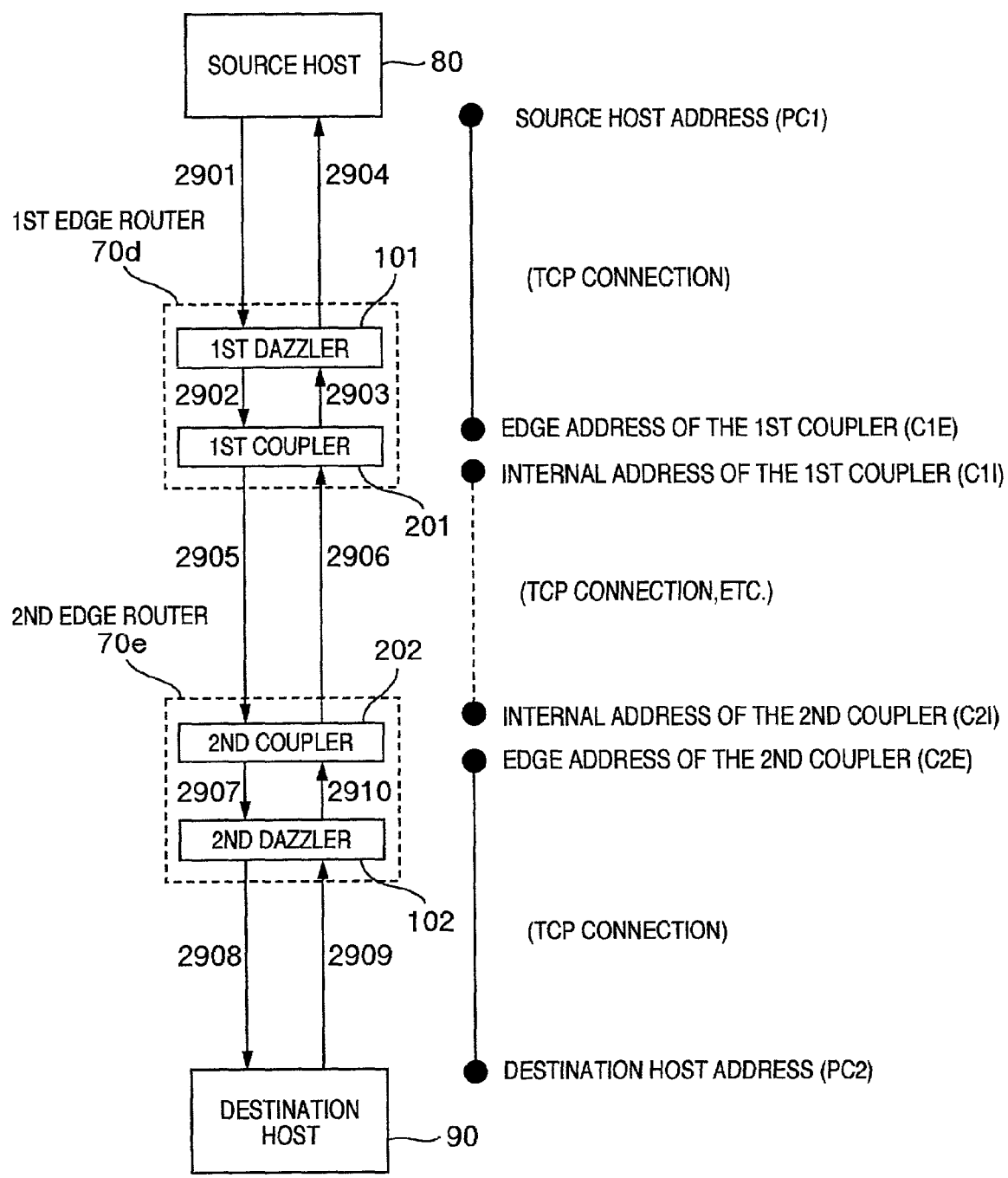
FIG. 4 is a diagram depicting the principle of the first embodiment of the present invention.
Figure 5:
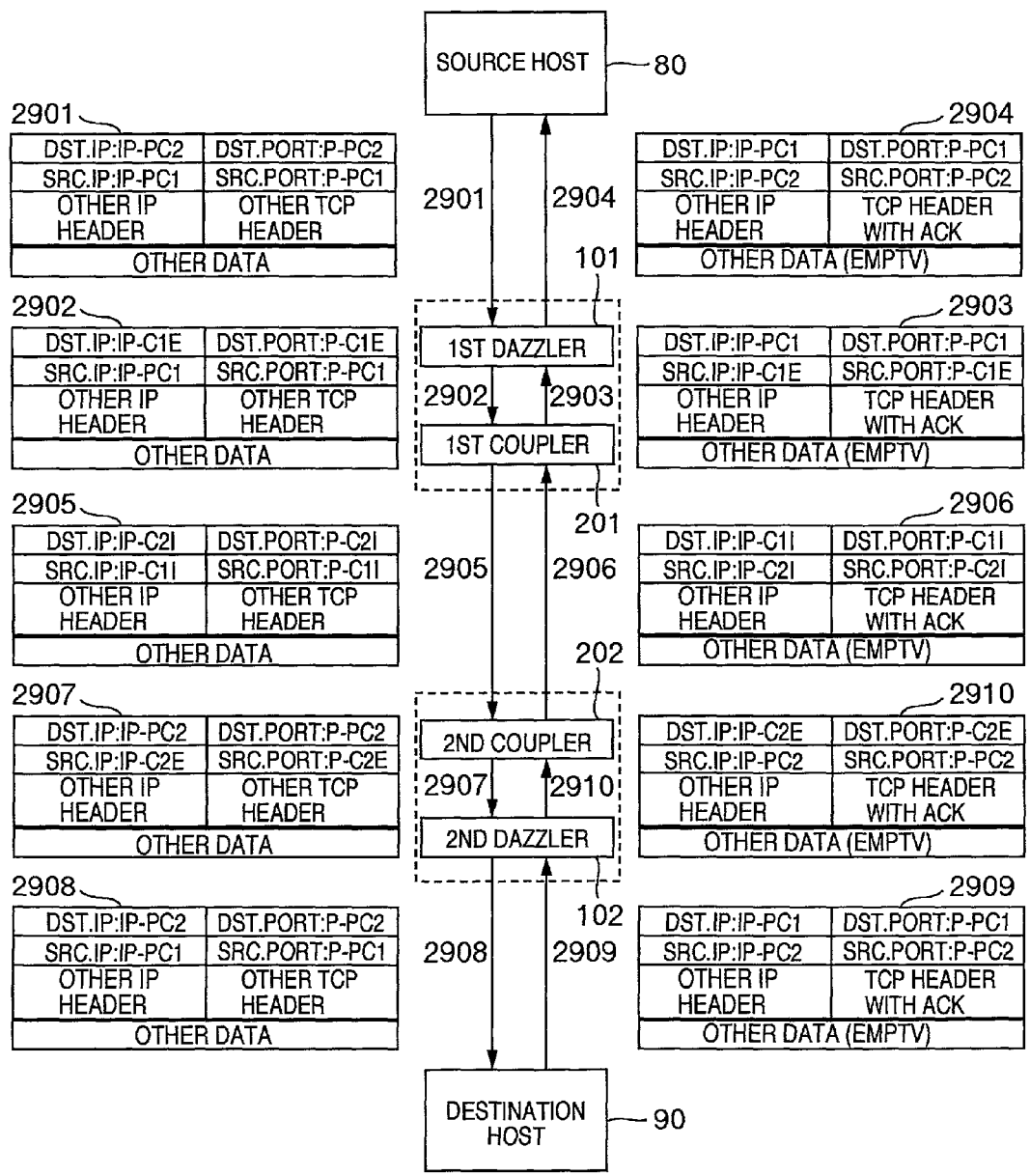
FIG. 5 shows the attributes of a TCP packet at a number of stages during its transmission.

FIG. 4 depicts the transmission of a TCP packet through a system according to the present invention and FIG. 5 shows the properties of a TCP packet transmitted between a source host 80, which is the sender of a packet, and a destination host 90, which is the destination of the packet. A first edge router 70*d* and a second edge router 70*e* are provided between the source host 80 and the destination host 90. The first edge router 70*d* includes a first dazzler 101 and a first coupler 201. Similarly, the second edge router 70*e* includes a second coupler 202 and a second dazzler 102.

The source host 80 sends a TCP packet to the first edge router 70*d* (step 2901), where the source address of the packet is the address of the source host 80 and the destination address of the packet corresponds to the address of the destination host 90. In FIG. 5, IP-PC1 and P-PC1 are IP address and port number of the source host 80, and IP-PC2 and P-PC2 are IP address and port number of the destination host 90.

When the TCP packet reaches the first edge router 70*d*, it is accepted by the first dazzler 101, which conducts address translation according to rules which are registered in the address translation information table 1500. The first dazzler translates the destination address of the packet to the edge address of the first coupler 201. Then the first dazzler 101 sends a translated packet to the first coupler 201 (step 2902). In FIG. 5, IP-C1E and P-C1E show edge IP address and edge port number of the first coupler 201.

The first coupler 201 terminates the TCP connection from the source host 80 because the destination address of the TCP packet corresponds to the edge address of the first coupler 201. Therefore an acknowledgement packet is sent to the source host 80 by the first coupler 201. That is, the first coupler 201 sends an acknowledgement packet, the source address of which is the edge address of the first coupler 201 and destination address of which is an address of the source host 80, to the first dazzler 101 (step 2903). This packet contains ACK flag in TCP header.

The first dazzler 101 translates an address in the acknowledgement packet in accordance with the address translation information table 1500. More precisely, the first dazzler 101 translates source address of the packet to the address of the destination host 90.

The translated acknowledgement packet is sent from the first dazzler 101 to the source host 80 (step 2904). The source host 80, which receives the acknowledgement packet, recognizes the packet as one sent from the destination host 90.

On the other hand, the TCP packet, which has been sent to the first coupler 201, is forwarded to the destination host 90. In order to achieve this, the first coupler 201 copies the data and sends it to the second coupler 202. Any types of protocols (TCP protocol, etc.) can be used for communication between these two couplers. In this embodiment, it is assumed that the TCP protocol is used.

The first coupler 201 sends a TCP packet (the source address of which is an internal address of first coupler 201, the destination address of which is an internal address of the second coupler 202) to the second coupler 202 (step 2905). In FIG. 5, IP-C1I and P-C1I correspond to the internal IP address and port number of the first coupler 201, and IP-C2I and P-C2I are the internal IP address and port number of the second coupler 202.

When the second coupler 202 receives the packet, the second coupler 202 sends an acknowledgement packet to the first coupler 201 (step 2906). Communication between these two couplers is done in this way.

Then the second coupler 202 sends a TCP packet (the source address of which is the edge address of 2nd coupler 202, the destination address of which is the address of the destination host 90) to the second dazzler 102 (step 2907).

In FIG. 5, IP-C2E and P-C2E corresponds to the edge IP address and edge port number of the second coupler 202.

The second dazzler 102 conducts address translation of the TCP packet according to address translation information table 1500. More precisely, the second dazzler 102 translates source address of the packet to the address of the source host 80.

After that, a translated TCP packet is sent from the second dazzler 102 to the destination host 90 (step 2908). The destination host 90, which receives this packet, recognizes this packet as one sent from the source host 80.

Then the destination host 90 sends an acknowledgement packet (the source address of which is the address of the destination host 90, the destination address of which is the address of the source host 80) to the second edge router 70e (step 2909).

When the second edge router 70e receives the acknowledgement packet from the destination host 90, the packet is accepted by the second dazzler 102. The second dazzler 102 conducts address translation according to the translation rules registered in the address translation information table 1500, i.e., the second dazzler 102 translates destination address of the packet to the edge address of the second coupler 202. Then the second dazzler 102 sends a translated packet to the second coupler 202 (step 2910).

The second coupler 202 terminates TCP connection from the destination host 90 because the destination address of this packet corresponds to the edge address of the second coupler 202.

Since the first dazzler 101, first coupler 201, second dazzler 102, and second coupler 202 operate in this way, the TCP connection between the source host 80 and the destination host 90 is divided into separate TCP connections as follows: "source host 80—first coupler 201", "first coupler 201—second coupler 202", "second coupler 202—destination host 90". In addition, the packets which the source host 80 sends/receives coincide with the packets which the destination host 90 receives/sends. Therefore, each host perceives a single TCP connection "source host 80—destination host 90" and does not acknowledge the presence of edge routers 70d and 70e. Furthermore, the performance of TCP communication will be improved because edge routers send acknowledgement packets and each host can receive these packets immediately as the acknowledgement packets do not pass through a delay link.

In this embodiment, the enhancement of the performance of a TCP communication system will be greatest when there is a delay link between the first coupler 201 and the second coupler 202 or the second coupler 202 and destination host 90. The improvement will not be so marked when a delay link is between the source host 80 and the first coupler 201.

As mentioned above, since the first and second edge routers 70d and 70e perform these operations, the original TCP connection 'between the source host 80 and source host 90' is divided into discrete TCP connections 'between the source host 80 and first edge router 70d', 'between the first edge router 70d and second edge router 70e' and 'between the second edge router 70e and destination host 90'. However, when viewed from the source host 80 and destination host 90, it looks as if a TCP connection were established 'between the source host 80 and destination host 90'. This is a virtual TCP connection. Each host can perform conventional TCP communication while the presence of the edge router 70 is imperceptible to each host.

The procedure for sending a data packet from the destination host 90 to the source host 80 follows a series of steps similar to that described above and thus its explanation will be omitted.

Figure 6:
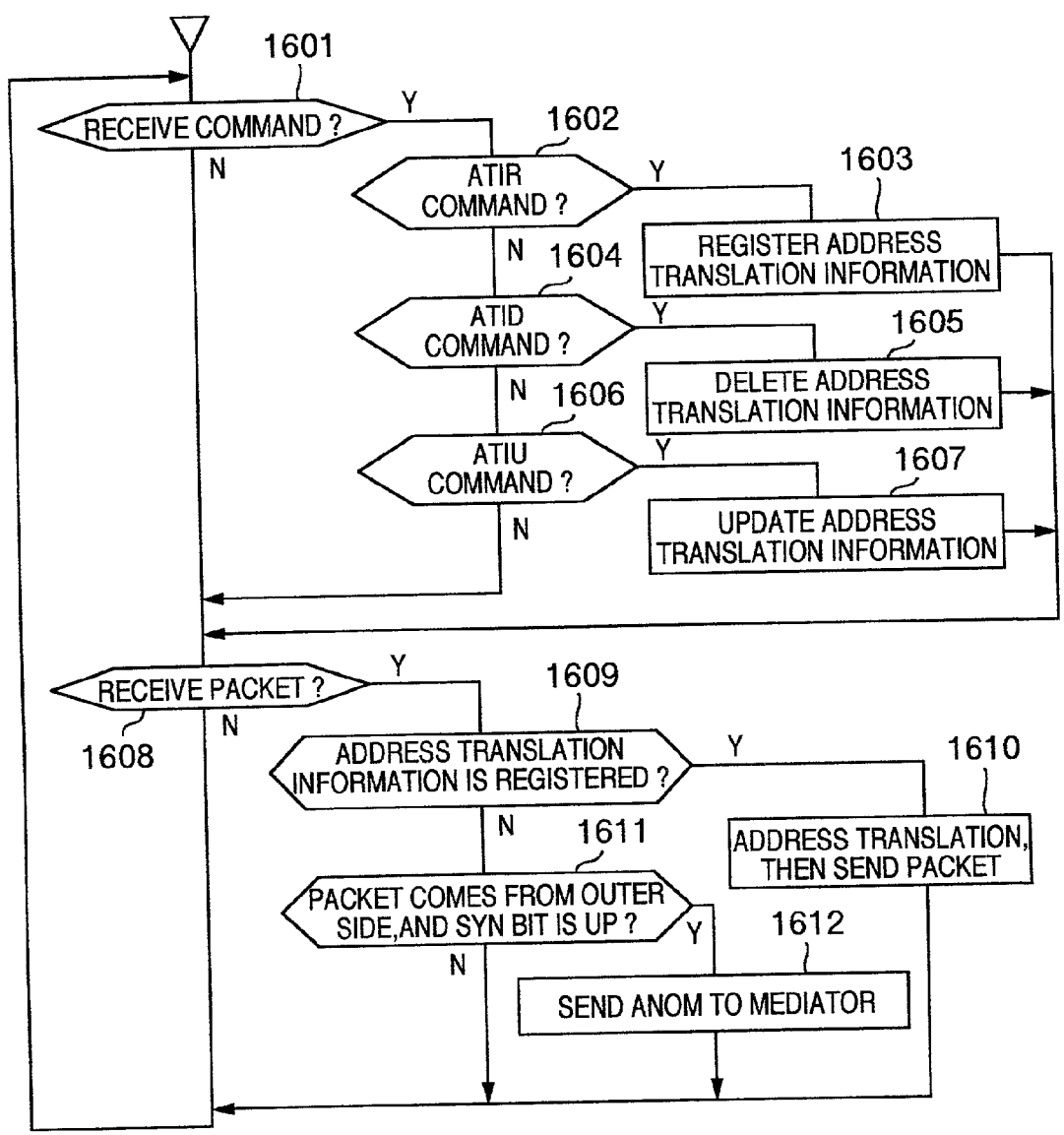
FIG. 6 is a flowchart of a dazzler program.

FIG. 6 is a flowchart for explaining the operation of a dazzler program. Firstly, the dazzler program determines whether a command from the mediator has been received (step 1601). If so, then the program examines whether or not the command indicates an address translation information registration command (step 1602). Where the received command is an ATIR command, the program registers the address translation information passed to the command in the address translation information table 1500 (step 1603). If not, then the program determines whether the command is an address translation information delete command (step 1604) and, if so, then the program deletes the address translation information specified by the command from the address translation information table 1500 (step 1605). If not, then the program examines whether or not the command is an address translation information update command (step 1606). If so, then the program updates the contents of the address translation information table 1500 specified by the command to new information (step 1607).

Next, the program examines whether a TCP packet has been received from either the network controller 'a' 1005a and network controller 'b' 1005b (step 1608). If so, then the program determines whether the IP address and port number of the packet have already been registered in the address translation information table 1500 (step 1609). If so, then the program performs address translation over the address according to the information of the address translation information table 1500 and outputs the address-translated packet (step 1610). If not, then the program examines whether or not the packet was received from the outer side and indicates a connection establishment command (step 1611). In this case, the TCP packet is determined to be a connection establishment command when a SYN bit is set in a TCP header and an ACK bit is cleared. For details thereof, refer to the RFC793. When the above conditions coincide with the conditions of the step 1611, the program sends an active nominate (ANOM) command to the mediator (step 1612).

The processing carried out by the dazzler program has been explained above.

The operation of the mediator will now be described. FIG. 7 shows the data structure of a virtual connection information table used by the mediator program in its operation. A virtual connection information table 2500 includes an active host IP address field 2501, an active host port number field 2502, an active edge IP address field 2503, an active edge port number field 2504, an active internal IP address field 2505, an active internal port number field 2506, a passive host IP address field 2507, a passive host port number field 2508, a passive edge IP address field 2509, a passive edge port number field 2510, a passive internal IP address field 2511, and a passive internal port number field 2512. Stored in the active host IP address field 2501 and active host port number field 2502 are the IP address and port number of the actively connected host respectively. Stored in the active edge IP address field 2503 and active edge port number field 2504 are the IP address and port number of the network controller 'b' 1005b installed in the edge router 70 on its actively connected host side. Also stored in the active internal IP address field 2505 and active internal port number field 2506 are the IP address and port number of the network controller 'a' 1005a installed in the edge router 70 on its actively connected host side. Stored in the passive host IP address field 2507 and passive host port number field 2508 are the IP address and port number of the passively connected host. Further stored in the passive edge IP address field 2509 and passive edge port number field 2510 are the IP address and port number of the network controller 'b' 1005b installed in the edge router 70 on its passively connected host side. Also stored in the passive internal IP address field 2511 and passive internal port number field 2512 are the IP address and port number of the network controller 'a' 1005a installed in the edge router 70 on its passively connected host side.

Figure 8:
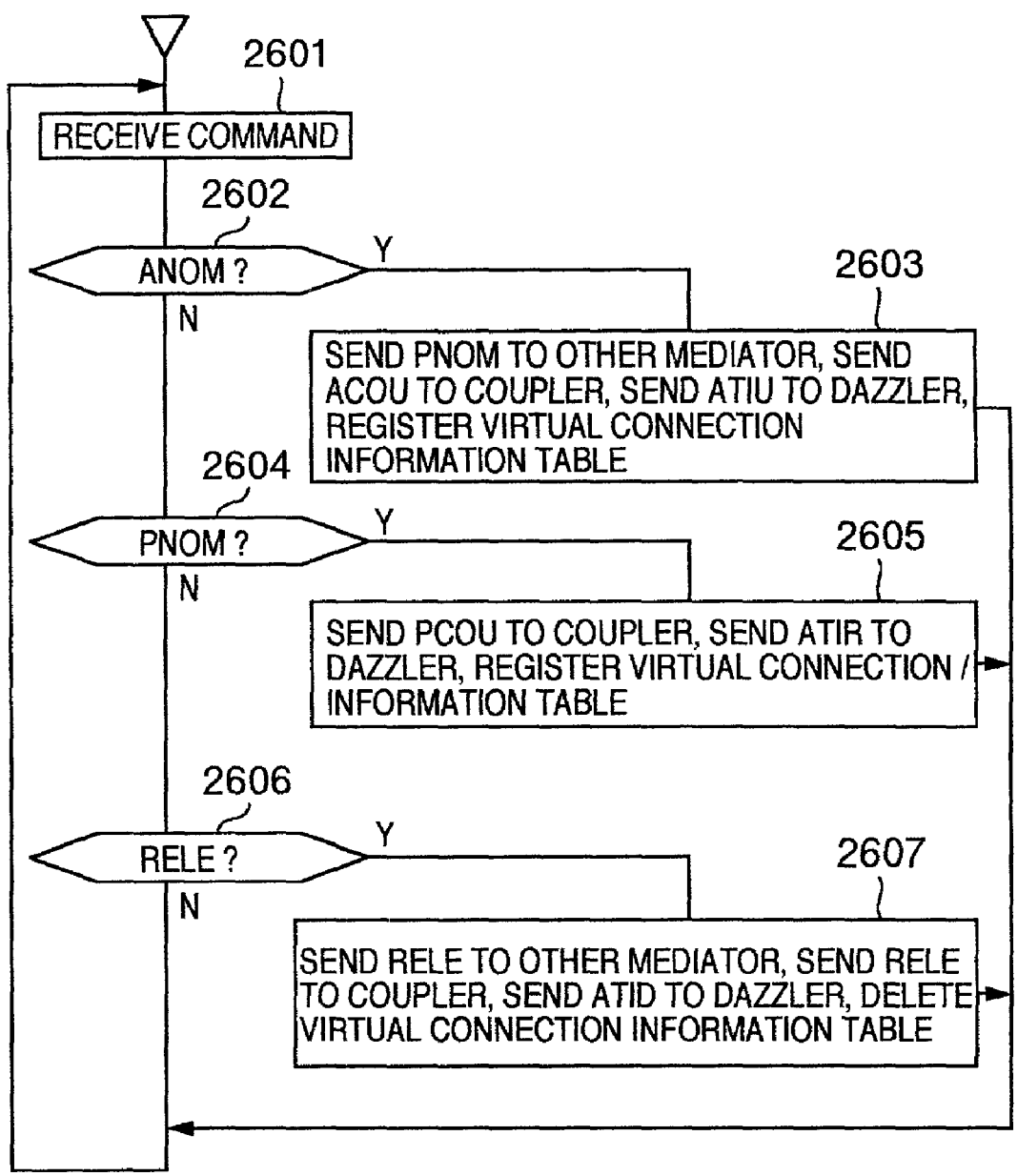
FIG. 8 is a flowchart of a mediator program.

The operation of the mediator program is shown in FIG. 8. When a command is received (step 2601), the mediator program examines whether or not the command is an active nominate command (step 2602). If so, then the program sends the active nominate command to the mediator of the opposing edge router 70, sends an active couple command to the coupler, sends an address translation information update command to the dazzler, and further registers the connection information in the virtual connection information table 2500 (step 2603). If not, then the program examines whether or not the command is a passive nominate command (step 2604). If so, then the program sends a passive couple command to the coupler, sends an address translation information register command to the dazzler, and registers the connection information in the virtual connection information table 2500 (step 2605). If not, then the program examines whether or not the command is a release command (step 2606). If so, then the program sends a release command to the opposing mediator, sends a release command to the coupler, sends an address translation information delete command to the dazzler, and further deletes connection information specified by the command from the virtual connection information table 2500 (step 2607).

The operation of the coupler will now be described. As mentioned above, there are two types of couplers, i.e., a parent process (parent coupler) and a child process (child coupler).

Figure 9:
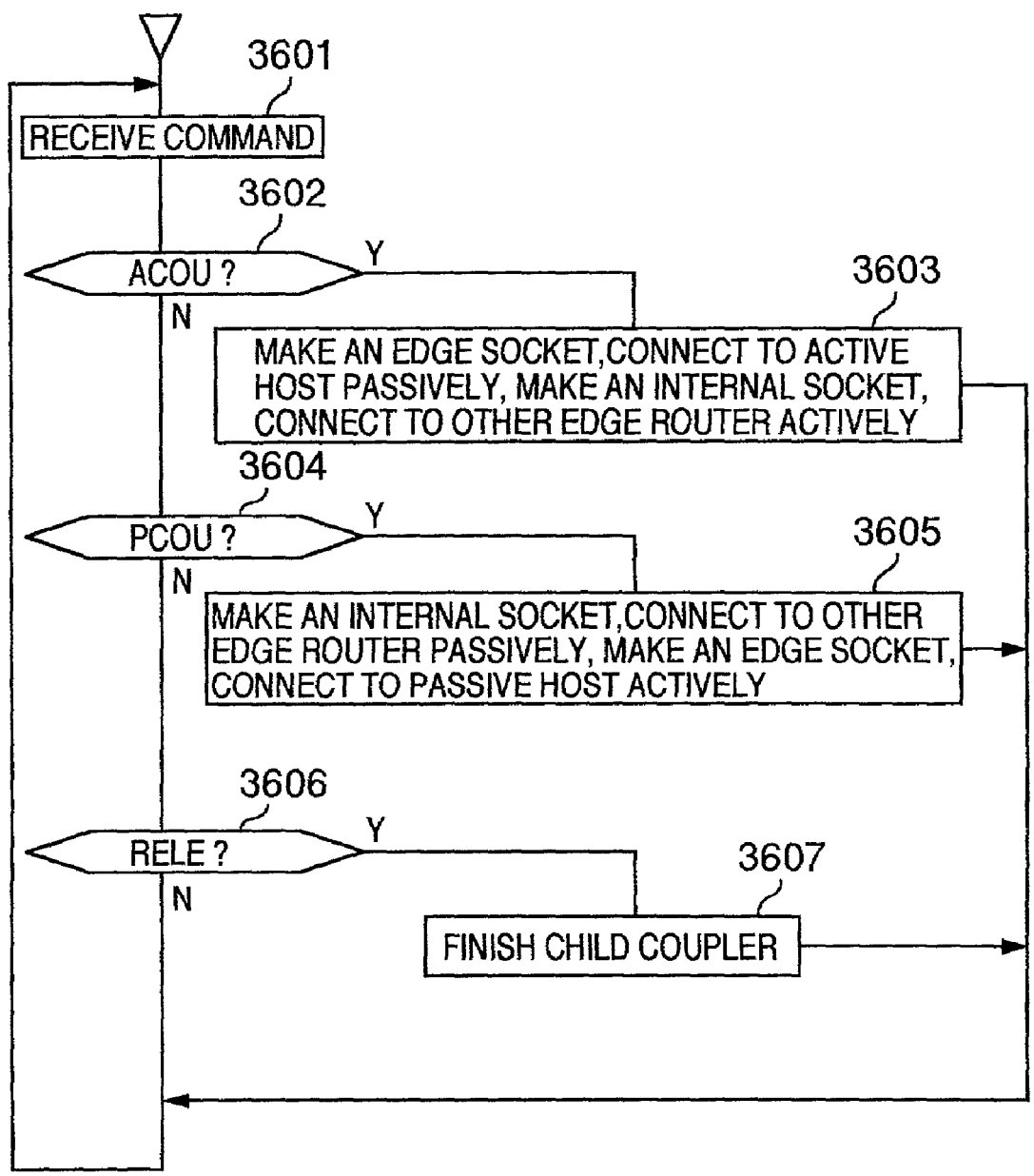
FIG. 9 is a flowchart of a parent coupler program.

FIG. 9 is a flowchart for explaining the parent coupler. When a command is received from a mediator (step 3601), the parent coupler examines whether or not the command is an active couple (ACOU) command (step 3602). If so, then the parent coupler generates a socket on the edge side of the edge router to passively connect it to the passive side host. Thereafter, the parent coupler generates a socket inside of the edge router to actively connect it to the internal address of the opposing edge router 70. And the parent coupler generates a child couple (step 3603). If not, then the parent coupler examines whether or not the command is a passive couple (PCOU) command (step 3604). If so, then the parent coupler generates a socket inside of the edge router to passively connect it to the internal address of the opposing edge router 70. Thereafter, the parent coupler generates a socket on the edge side of the edge router to passively connect it to the passive host address. And the parent coupler generates a child coupler (step 3605). If not, then the parent coupler examines whether or not the command is a release (RELE) command (step 3606). If so, then the parent coupler terminates the corresponding child coupler (step 3607). In this connection, the word 'socket' as used herein refers to a pair of an IP address and a port number for identification of connection end point (end point). For details, refer to "UNIX Network Programming-Second Edition", written by W. Richard Stephenson, 1999, published by K. K. Piason Education, ISBN4-89471-205-9.

Figure 10:
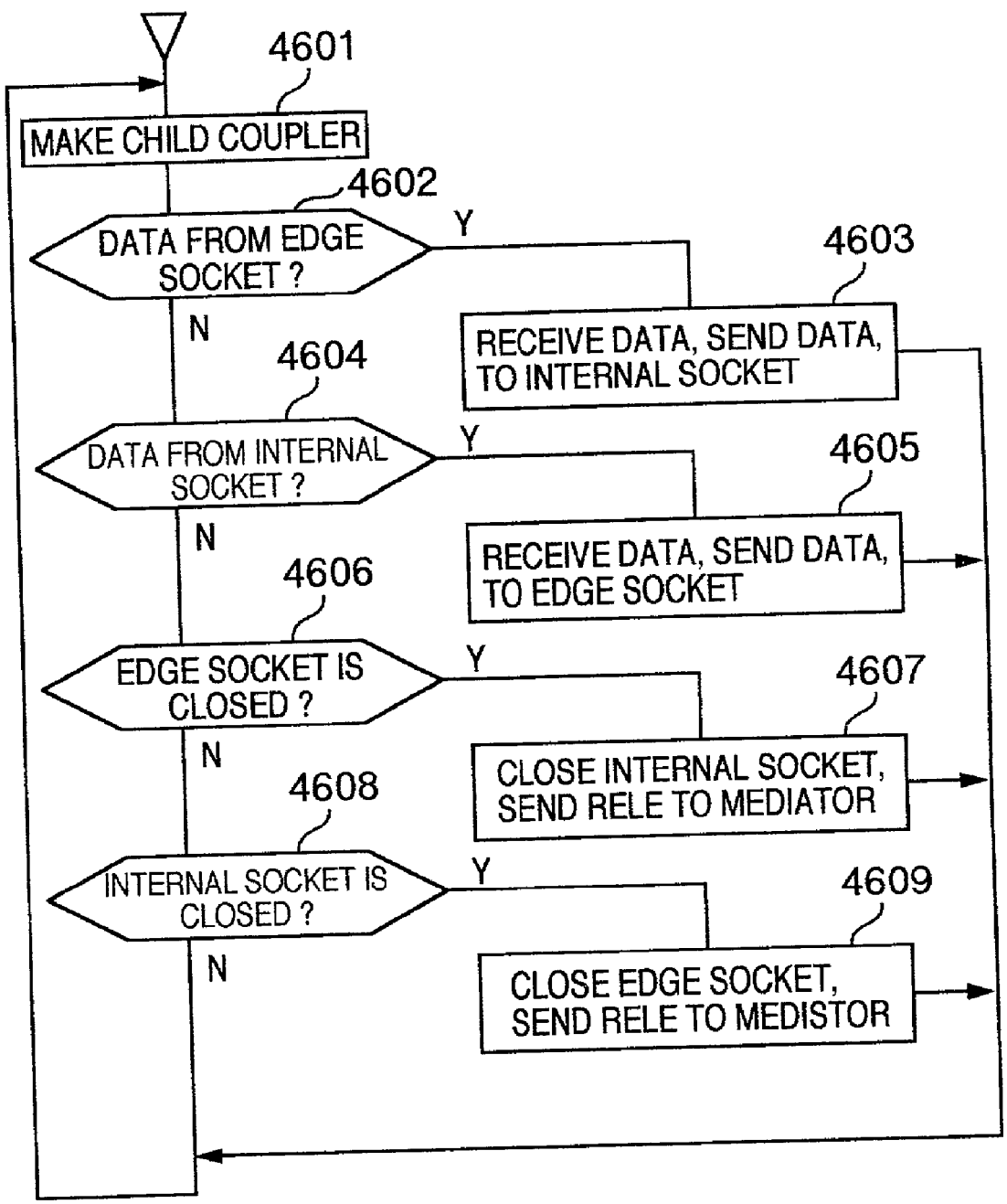
FIG. 10 is a flowchart of a child coupler program.

FIG. 10 is a flowchart for explaining the child coupler. When the parent coupler generates a child coupler by the active or passive couple command (step 4601), the child coupler examines whether or not there is a received data in the edge socket (step 4602). If so, then the child coupler receives the data and sends it to the inner socket (step 4603). If not, then the child coupler examines whether or not there is received data in the inner socket (step 4604). If so, then the child coupler receives the data and sends it to the edge side socket (step 4605). If not, then the child coupler examines whether or not the edge side socket is closed (step 4606). If so, then the child coupler closes the inner socket and sends a release command to the mediator (step 4607). If not, then the child coupler examines whether or not the inner socket is closed (step 4608). If so, then the child coupler closes the edge side socket and sends the release command to the mediator (step 4609).

Figure 11:
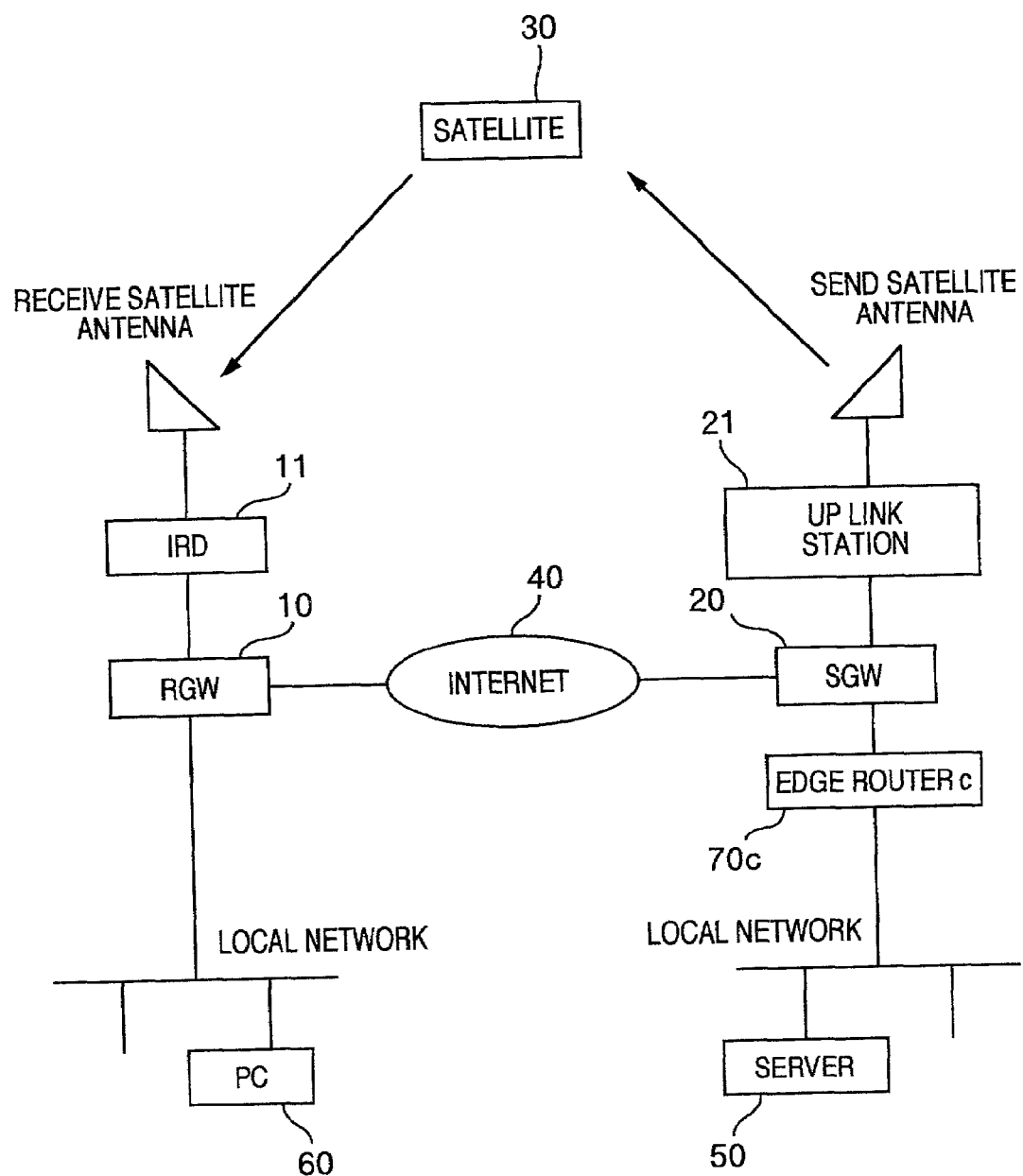
FIG. 11 is a diagram showing an arrangement of the system according to a second embodiment of the present invention.

FIG. 11 shows an arrangement of the system in accordance with another embodiment of the present invention.

The exemplary arrangement of FIG. 11 includes a receive gateway (RGW) 10, an integrated receiver decoder (IRD) 11, a send gateway (SGW) 20, an uplink station 21, a satellite 30, Internet 40, a server 50, a personal computer (PC) 60 and an edge router 70c. Although the edge routers 'a' 70a and edge router 'b' 70b have been installed in satellite send and receive station sides, respectively in the embodiment of FIG. 1, the edge router 70c is installed in only the satellite send station side in FIG. 11. However, in place of installing the edge router 70c only in the satellite send station side, it is also possible to install the edge router 70c only in the satellite receive station side, or to install a router 70c in the satellite 30 itself.

The edge router 70c in the present embodiment includes a single communication apparatus corresponding to a combination of the first and second edge routers 70d and 70e in FIG. 4. The edge router 70c performs the role of the first and second edge routers 70d and 70e in the single communication apparatus, and performs, in principle, exactly the same operations as shown in FIG. 4. Thus, the edge router 70c performs address translation over the TCP packet, divides the TCP connection and performs acknowledgement operations, thereby simulating a single TCP connection.

Figure 12:
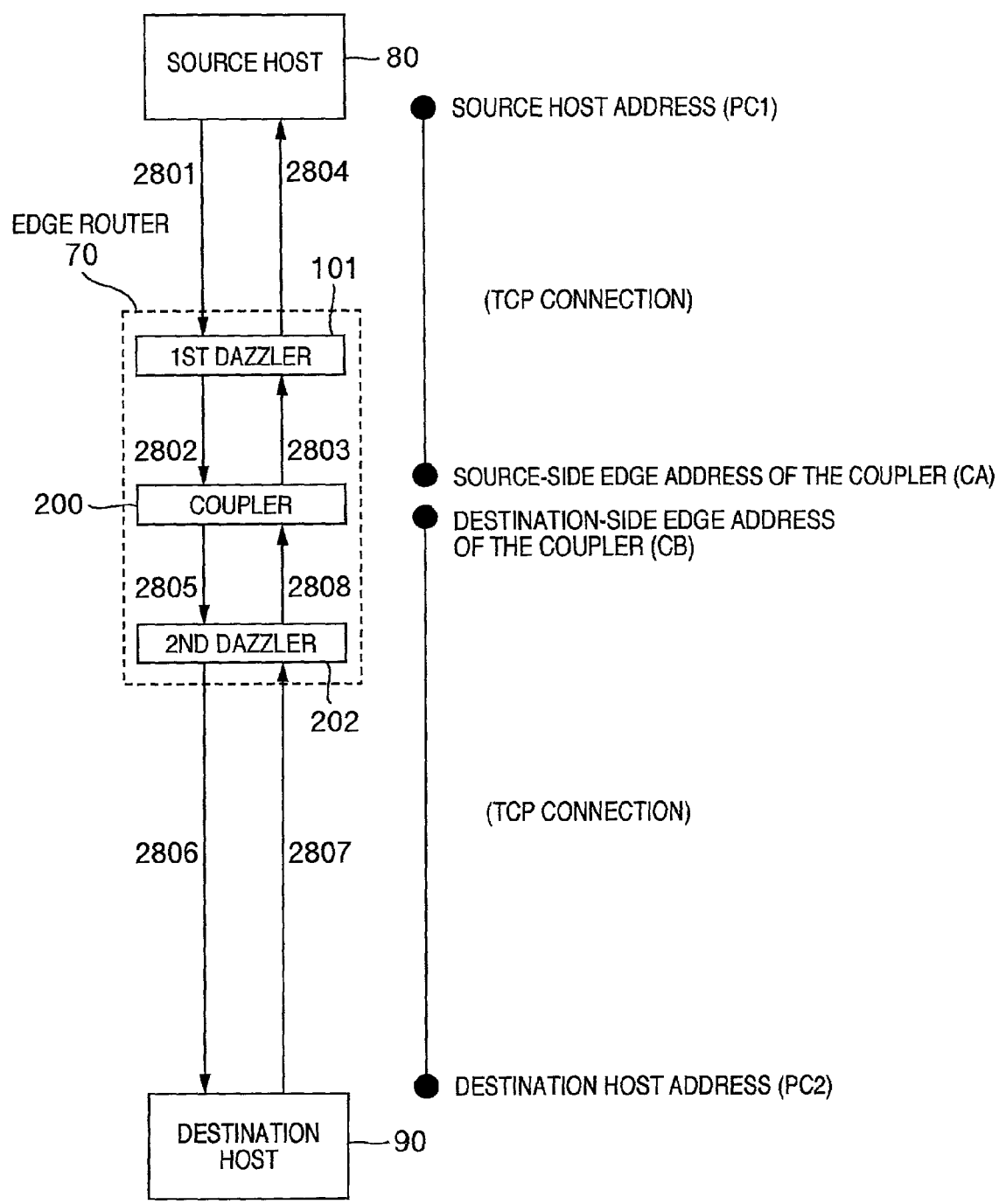
FIG. 12 is a block diagram of the second embodiment of the communication system.
Figure 13:
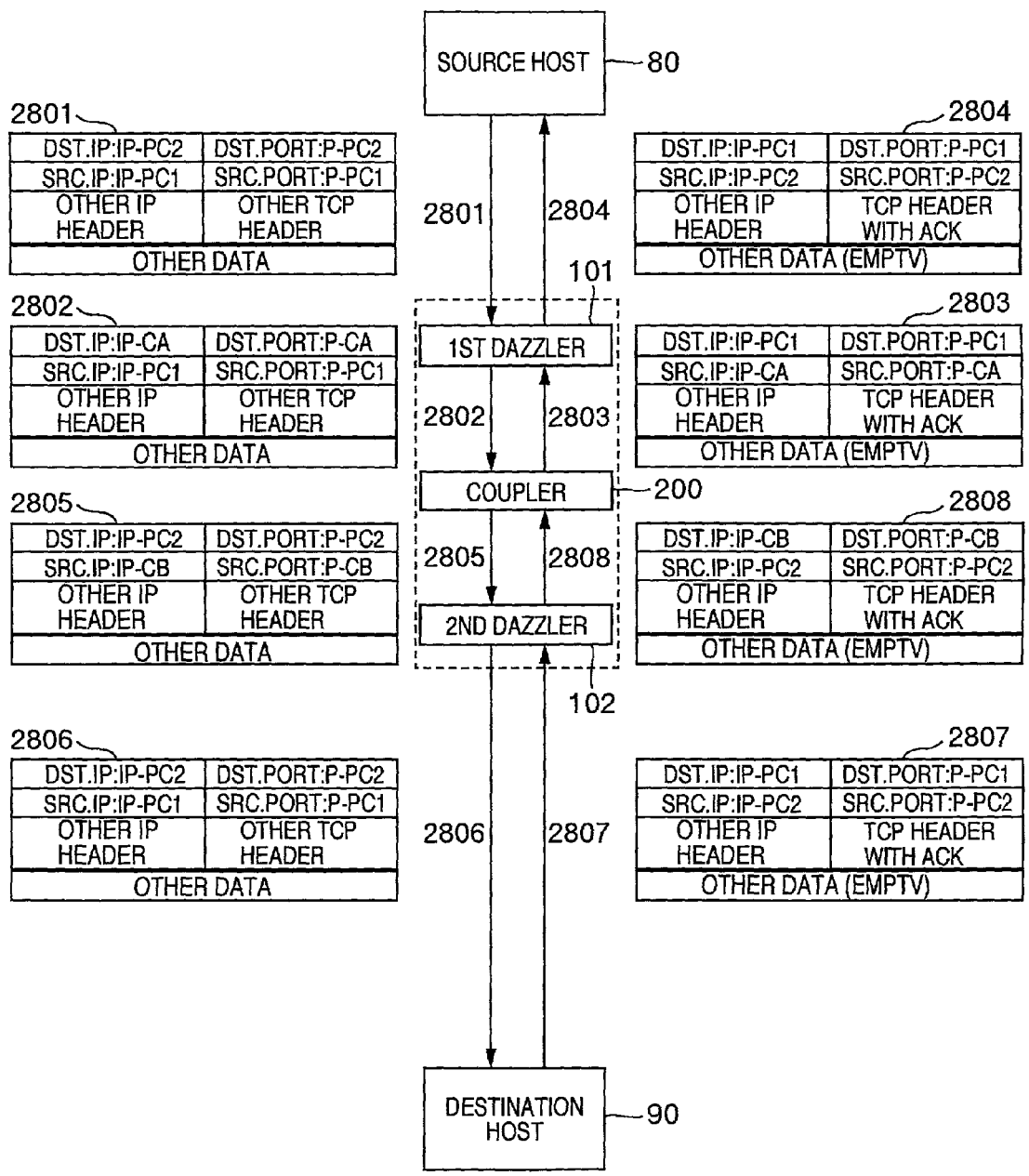
FIG. 13 shows the attributes of a TCP packet at a number of stages during its transmission according to the second embodiment.

FIG. 12 shows the communication system of the second embodiment of the invention and FIG. 13 shows the attributes of the TCP packets that are sent using the system.

In this embodiment an edge router 70 is provided between a source host 80 and a destination host 90. The edge router 70 includes a first dazzler 101, a coupler 200, and a second dazzler 102.

Firstly, the source host 80 sends a TCP packet (the source address of which is the address of the source host 80, and the destination address is the address of the destination host 90) to the edge router 70 (step 2801). In FIG. 13, IP-PC1 and P-PC1 are the IP address and port number of the source host 80, and IP-PC2 and P-PC2 are the IP address and port number of the destination host 90.

The edge router 70 receives the TCP packet, which is accepted by the first dazzler 101. The first dazzler 101 conducts address translation according to translation rules which are registered in an address translation information table 1500 in advance. More precisely, the first dazzler 101 translates the destination address of the packet to the source-side edge address of the coupler 200. Then the first dazzler 101 sends a translated packet to the coupler 200 (step 2802). In FIG. 13, IP-CA and P-CA show the source-side edge IP address and port number of the coupler 200.

The coupler 200 terminates the TCP connection from the source host 80 because the destination address of the TCP packet corresponds to the source-side edge address of the coupler. Therefore, an acknowledgement packet is sent to the source host 80 by the coupler 200. That is, the coupler 200 sends an acknowledgement packet (the source address of which is the source-side edge address of coupler and the destination address of which is the address of the source host 80) to the first dazzler 101 (step 2803). This packet contains ACK flag in TCP header.

The first dazzler 101 performs an address translation on the acknowledgement packet according to the translation rules in the address translation information table 1500, wherein the first dazzler 101 translates source address of this packet from the source-side edge address of the coupler 200 to the address of the destination host 90.

After that, the translated acknowledgement packet is sent from the first dazzler 101 to the source host 80 (step 2804). The source host 80, which receives the acknowledgement packet, recognizes the packet as one sent from the destination host 90.

On the other hand, the TCP packet, which has been sent to the coupler 200, must be sent to the destination host 90. In order to achieve this, the coupler 200 sends the TCP packet (the source address of which is the destination-side edge address of coupler, the destination address of which is the address of the destination host 90) to the second dazzler 102 (step 2805). In FIG. 13, IP-CB and P-CB correspond to the destination-side edge IP address and port number of the coupler 200.

The second dazzler 102 conducts address translation of the TCP packet according to the address translation information table 1500, i.e., the second dazzler 102 translates source address of this packet to the address of the source host 80.

After that, the translated TCP packet is sent from the second dazzler 102 to the destination host 90 (step 2806). The destination host 90, which receives the packet, recognizes that this packet is sent from the source host 80.

The destination host 90 then sends an acknowledgement packet (the source address of which is the address of the destination host 90, the destination address of which is the address of the source host 80) to the edge router 70 (step 2807).

The edge router 70 receives the acknowledgement packet, which is accepted by the second dazzler 102. The second dazzler 102 conducts address translation according to translation rules registered in the address translation information table 1500, wherein the second dazzler 102 translates destination address of the packet to the destination-side edge address of the coupler 200. Then the second dazzler 102 sends a translated packet to the coupler 200 (step 2808).

The coupler 200 terminates the TCP connection from the destination host 90 because the destination address of the TCP packet corresponds to the destination-side edge address of the coupler 200.

Since the first dazzler 101, the coupler 200, and the second dazzler 102 execute in this way, TCP connection between the source host 80 and the destination host 90 is divided into "source host 80—coupler 200" and "coupler 200—destination host 90". In addition, packets being sent/received by the source host 80 coincide with packets being received/sent by the destination host 90. Therefore, each host perceives a single TCP connection "source host 80—destination host 90" and does not acknowledge of the presence of edge router 70. Furthermore, the performance of TCP communication link will be improved because edge router sends acknowledgement packets and each host can receives these packets immediately without them passing through a delay link.

In this embodiment, the performance enhancement of TCP communication will be greatest when there is a delay link in "the coupler 200—destination host 90". The improvement in TCP performance will not be so marked when a delay link is in "source host 80—the coupler 200".

Figure 14A:
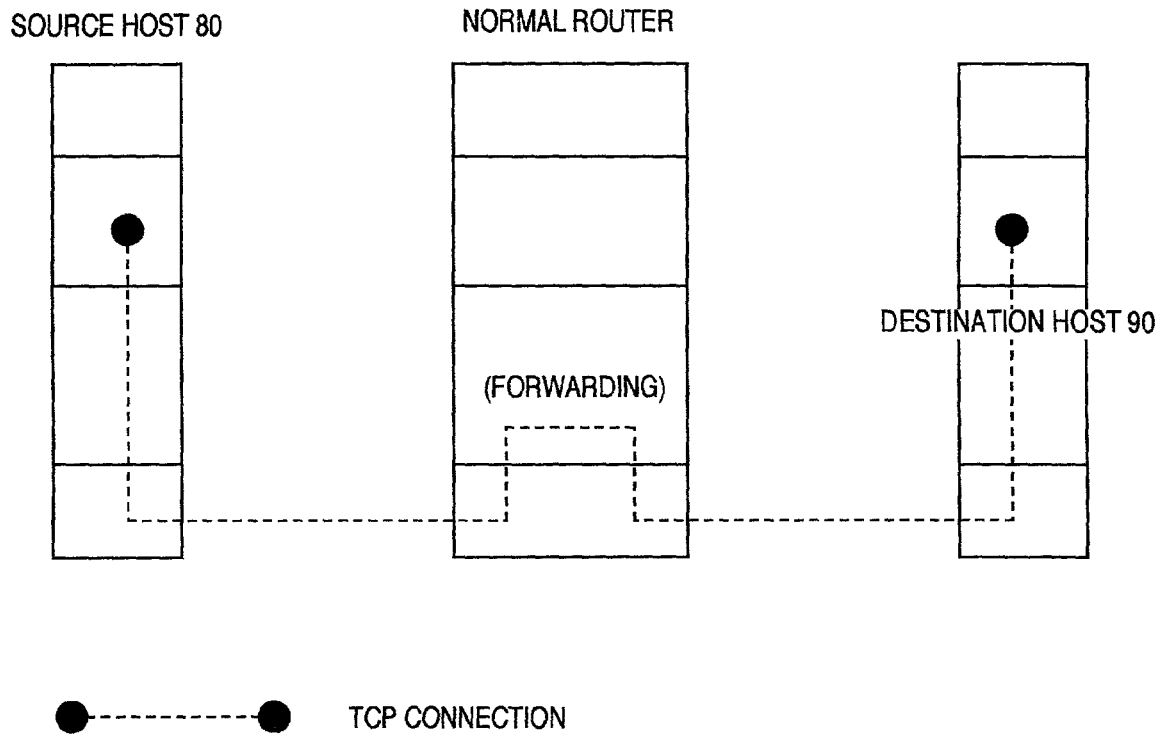
FIG. 14a is a diagram showing the communication architecture of a conventional system.
Figure 14B:
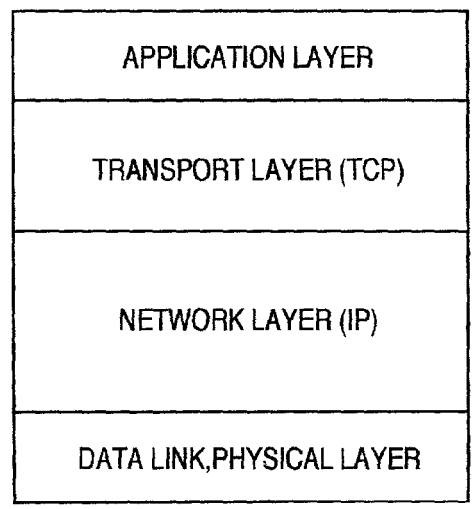
FIG. 14b depicts the structure of the communication architecture shown in FIG. 14a, and subsequent FIGS. 15 and 16.

FIG. 14*a* shows TCP connection between source host 80 and destination host 90 through a conventional router, and FIG. 14*b* shows the communication architecture of communication equipments thereof.

In FIG. 14*a*, the TCP connection between the source host 80 and destination host 90 is indicated by a broken line.

As shown in FIG. 14*b*, the communication architecture consists of layers, "data link, physical layer", "network layer", "transport layer" and "application layer" from the bottom to top. Each layer provides its own function. The TCP protocol belongs to transport layer and IP protocol belongs to network layer.

Regarding TCP connection between the source host 80 and the destination host 90, the conventional router forwards packets at the network layer according to the destination address (IP address) of packets. The TCP connection is not divided at the conventional router.

Figure 15:
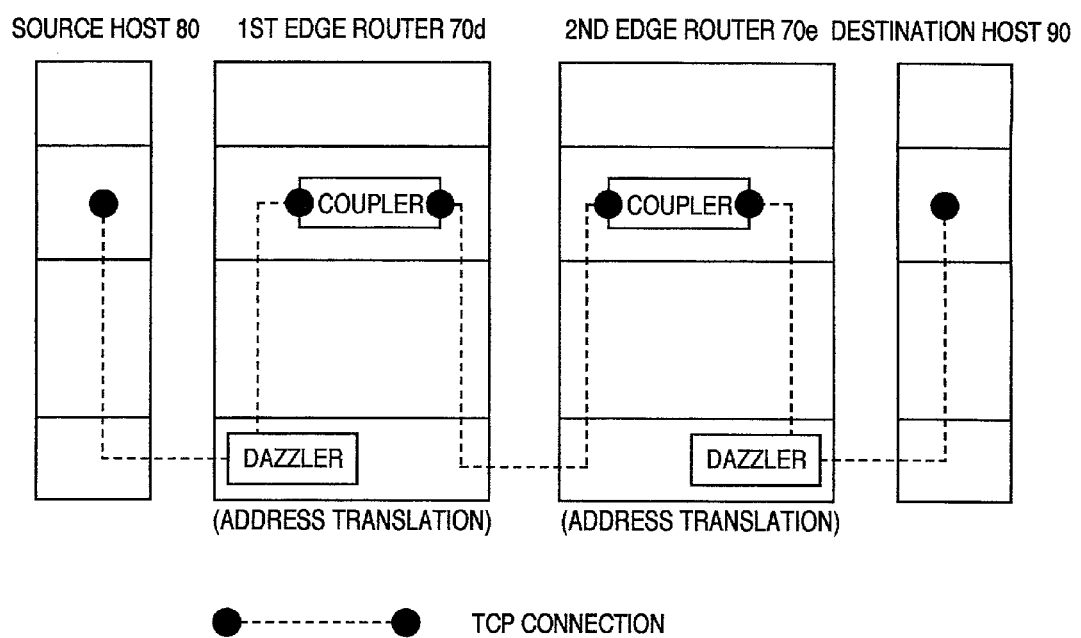
FIG. 15 shows the communication structure of the first embodiment of the communication system.

FIG. 15 shows communication architecture of the first embodiment.

As shown in FIG. 15, in the first edge router 70*d*, the dazzler conducts address translation of TCP packets from the source host 80 at the data link, in physical layer. The translated TCP packet is sent to the transport layer, and the TCP connection is terminated at this layer.

The coupler of the first edge router 70*d* is coupled to the coupler of the second edge router 70*e* via a connection according to any protocol. In this case, this connection is a TCP connection.

The coupler of the second edge router 70*e* is coupled to the destination host by a TCP connection. The dazzler of the second edge router conducts address translation of packets and forwards the TCP packets to the destination host 90.

In this case, 3 TCP connections "the source host 80—the 1st edge router 70*d*", "the 1st edge router 70*d*—the 2nd edge router 70*e*", and "the 2nd edge router 70*e*—the destination host 90" are established.

Figure 16:
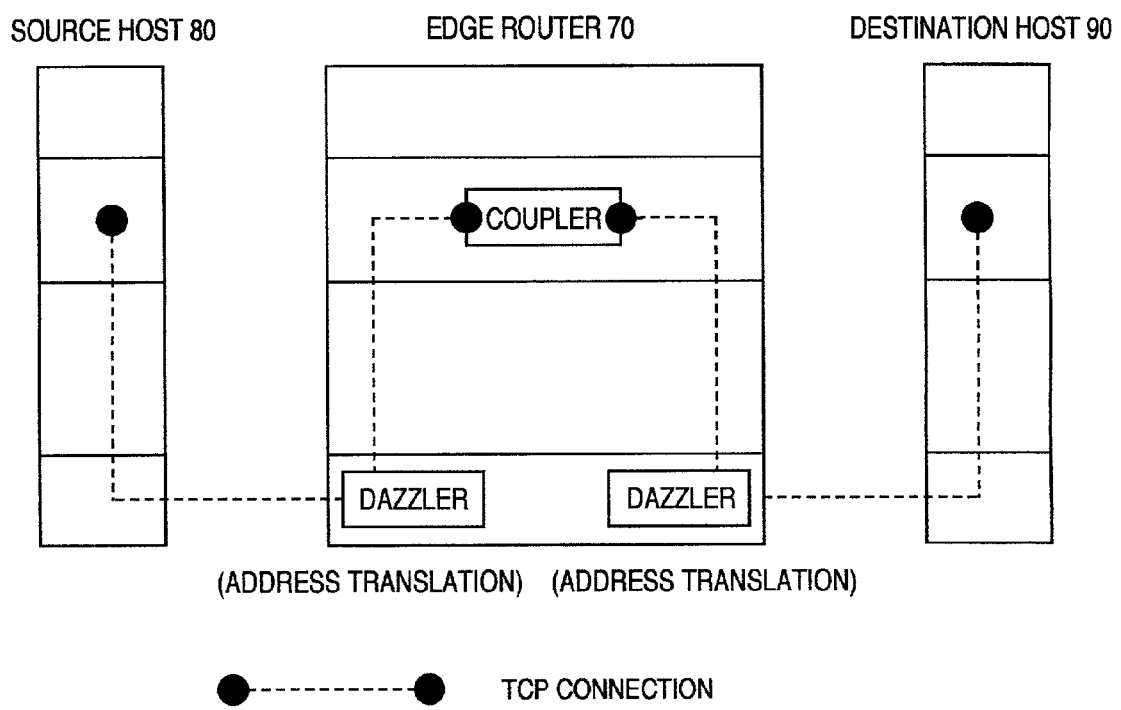
FIG. 16 depicts the communication structure of the second embodiment of the communication system.

FIG. 16 shows the communication architecture of the second embodiment.

As shown in FIG. 16, in the edge router 70, dazzler conducts address translation of TCP packets from the source host 80 at the data link, in physical layer. Translated TCP packets are sent to the transport layer, and TCP connection is terminated at this layer.

The coupler of the edge router 70 is coupled to the destination host 90 by a connection using TCP. The dazzler of the edge router 70 conducts address translation again and then the TCP packets are sent to the destination host 90.

In this case, 2 TCP connections "the source host 80—the edge router 70" and "the edge router 70—the destination host 90" are established.

As has been mentioned above, in accordance with the present invention, there can be formed a system which, when communication is carried out in accordance with TCP, or another protocol which requires a destination host to return an acknowledgement for data received from a source host and limits the amount of data that can be sent in a manner similar to the restricted TCP window size, using a high-speed but large-delay link, can suppress delay influences and realize high-speed communication without modifying the existing protocol.

Furthermore, while the described embodiments comprise edge routers (70), the router, or routers, according to the present invention may be situated anywhere along the route between the source host (80) and the destination host (90), including a location aboard a satellite (30).

The specification and drawings are, accordingly, to be regarded in an illustrative rather than a restrictive sense. It will, however, be evident that various modifications and changes may be made thereto without departing from the broader spirit and scope of the invention as set forth in the claims.

The invention claimed is:

1. A TCP communication system wherein communication is carried out between a source host and a destination host via a network system and a time until a window size of the source host reaches its upper limit is longer than a time until reception of a TCP acknowledgement, said TCP communication system comprising:
the network system; and
a single edge router connected to a local system to which a host for communication belongs, wherein the edge router is located between the source host and the destination host,
wherein the edge router comprises:
means for terminating a TCP connection between the source host and the destination host; and
first and second address translation means for performing address translation operations of a TCP packet to cause the connection, to thereby allow TCP acknowledgement,
wherein said first address translation means translates a destination address of a first TCP packet received from said source host to said edge router to an address of said edge router, and forwards said first TCP packet to said means for terminating a TCP connection,
wherein said means for terminating a TCP connection generates a packet for acknowledgement responsive to reception of the first TCP packet and forwards the packet for acknowledgement to said first address translation means, and said first address translation means translates a source address of said packet for acknowledgement from a source-side edge address of said means for terminating a TCP connection to an address of the destination host and forwards the translated packet for acknowledgement to said source host, and wherein said means for terminating a TCP connection modifies and forwards said first TCP packet to said second address translation means, and said second address translation means translates a source address of said first TCP packet received from said means for terminating a TCP connection, into an address of said source host, and forwards the translated first TCP packet to the destination host.

2. The TCP communication system according to claim 1, wherein said single edge router is provided at a boundary between a local system to which the source host belongs and the network system or at a boundary between a local system to which the destination host belongs and the network system.

3. An edge router for use in a TCP communication system wherein communication is carried out between hosts via a network system and a time until a window size of a source host reaches its upper limit is longer than a time until reception of a TCP acknowledgement, said edge router comprising:

TCP connection terminating means for terminating a TCP connection between hosts; and
first and second address translation means for performing address translation operations over a TCP packet to cause the TCP connection to look like a virtually single TCP connection, to thereby allow TCP acknowledgement operations;
wherein said first address translation means translates a destination address of a TCP packet received from said source host to said edge router into an address of said edge router, and forwards said TCP packet to said TCP connection terminating means, and said TCP connection terminating means generates a second TCP packet by modifying the first packet and forwards said second TCP packet to said second address translation means, and said second address translation means translates a source address of said second TCP packet received from said TCP connection terminating means, into an address of said source host.

* * * * *